United States Patent [19]
Föhl

[11] Patent Number: 5,882,071
[45] Date of Patent: Mar. 16, 1999

[54] VEHICLE SEAT WITH HEADREST ADJUSTABLE ON THE BACKREST

[75] Inventor: Artur Föhl, Schorndorf, Germany

[73] Assignee: TRW Occupant Restraint Systems GmbH, Alfdorf, Germany

[21] Appl. No.: 904,673

[22] Filed: Aug. 1, 1997

[30] Foreign Application Priority Data

Aug. 28, 1996 [DE] Germany ................. 296 14 978.0

[51] Int. Cl.⁶ .......................................... B60N 2/42
[52] U.S. Cl. ................... 297/216.12; 297/216.16
[58] Field of Search ................ 297/216.1, 216.12, 297/216.13, 216.14; 280/748, 751, 753

[56] References Cited

U.S. PATENT DOCUMENTS

| | | | |
|---|---|---|---|
| 3,420,572 | 1/1969 | Bisland | 297/216.12 X |
| 3,802,737 | 4/1974 | Mertens | 297/216.12 X |
| 4,610,480 | 9/1986 | Yamada et al. | 297/478 |
| 5,542,697 | 8/1996 | Fohl | 297/478 X |

FOREIGN PATENT DOCUMENTS

| | | | |
|---|---|---|---|
| 2232726 | 1/1974 | Germany | 297/216.12 |
| 2152202 | 11/1980 | Germany | 297/216.12 |

*Primary Examiner*—Peter R. Brown
*Attorney, Agent, or Firm*—Tarolli, Sundheim, Covell, Tummino & Szabo

[57] ABSTRACT

A vehicle seat for a vehicle occupant has a backrest, a headrest arranged adjustable on the backrest and being movable from a normal starting position into a restraint position approximating the head of the vehicle occupant, a vehicle-sensitive activatable positioner and a flexible traction transmitting means connecting the headrest and the positioner. The positioner moves the headrest in the case of a rear end collision of the vehicle from the normal starting position into the restraint position by transmitting force via the traction transmitting means. The traction transmitting means extends through the backrest.

19 Claims, 5 Drawing Sheets

VEHICLE SEAT WITH HEADREST ADJUSTABLE ON THE BACKREST

FIELD OF THE INVENTION

The invention relates to a vehicle seat.

BACKGROUND OF THE INVENTION

A headrest prevents among other things in the case of a rear end collision that the head of a vehicle occupant is catapulted rearwards relative to the vehicle. It is usually the case that headrests are insertable and height-adjustable in the backrest. In addition headrests also exist which are configured as an elongated, fixed part of the backrest of the vehicle seat. In the case of headrests currently available in vehicles, irrespective of whether the headrests are adjustable or non-adjustable, the nape of the neck of the vehicle occupant is exposed to high loads during a rear end collision because the distance of the head from the headrest, despite the pad of the back on the backrest, may be relatively large (up to 160 mm).

To relieve these loads it has already been proposed to accommodate a small gas bag in the headrest. In a crash situation, an inflator, controlled via a sensor, is activated which inflates the gas bag within a few milliseconds. Since, however, the spacing of the head from the gas bag may differ very appreciably, a very short head-to-headrest spacing, for instance, would even bump the head from the gas bag, representing an undesirable load.

Means have also been proposed which by spring storage energy or pyrotechnically in a crash situation keep track of support for the head via a corresponding activation means such that the means instantly halts in the current position in the case of head contact. However, no satisfactory solution has been found for transmitting the force to the head support.

BRIEF SUMMARY OF THE INVENTION

By means of the invention, a cost-effectively producable seat having a headrest is made available which in the case of a rear end collision reduces the forces acting on the head and in the region of the nape of the neck. The vehicle seat according to the invention has a backrest, a headrest arranged adjustable on the backrest and being movable from a normal starting position into a restraint position approximating the head of the vehicle occupant, a vehicle-sensitive activatable positioner and a flexible traction transmitting means connecting the headrest and the positioner. The positioner moves the headrest in the case of a rear end collision of the vehicle from the normal starting position into the restraint position by transmitting force via the traction transmitting means. The traction transmitting means extends through the backrest. By providing the flexible traction transmitting means the positioner can thus be disposed in any position, for example within the backrest or under the vehicle seat. The height-adjustability of the headrest and the adjustability of the seat back are not detrimented by the flexible traction transmitting means, particularly when the latter is installed with an adequate length in reserve. Preferably the flexible traction transmitting means, particularly a Bowden cable, forms a loop in the interior of the backrest of the vehicle seat.

The vehicle seat according to the invention may be provided with a swivable or linearly shiftably mounted headrest. In the latter case it is possible that the traction transmitting means engages directly a mounting section of the headrest, which is part of a linear guide, or that the traction transmitting means sets a pinion gear or lever in movement which in turn shifts the headrest. A linearly shiftable headrest is particularly suitable for rear vehicle seats.

DETAILED DESCRIPTION OF PREFERRED EMBODIMENTS

Figure 1:
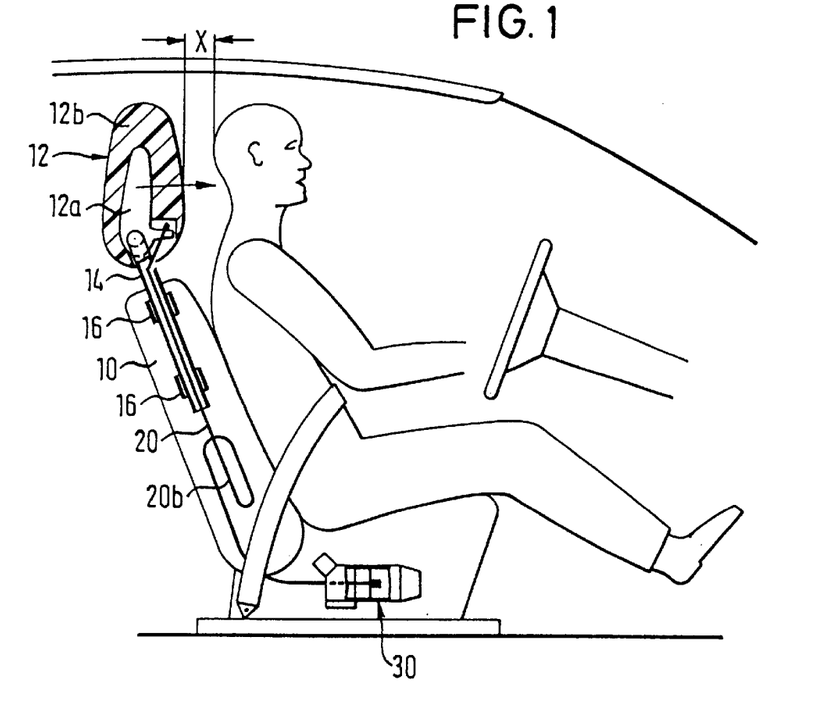
FIG. 1 is a partly sectioned schematic side view of a vehicle eat in a vehicle in accordance with a first embodiment, in which the headrest is mounted swivably on the vehicle seat.

The vehicle seat shown in FIG. 1 is provided in the usual manner with a headrest 12 inserted height-adjustably in the backrest 10. The headrest 12 comprises a rigid, hollow molding 12a, padding 12b surrounding the latter and a bracket 14 formed by a bent tube, the straight legs of which are accommodated shiftably in the guides 16 of the backrest 10.

As shown in FIG. 1 it is normally so that between the head of the vehicle occupant and the surface of the headrest facing the latter a spacing X remains which may amount to 100 mm or more. Due to the configuration according to the invention of the vehicle seat this spacing X is eliminated or at least strongly reduced by the headrest 12 being swivable forwardly in the direction of the arrow evident in FIG. 1 and is thus made to approximate the head of the vehicle occupant when a predetermined threshold value is exceeded in a rear end collision of the vehicle.

Figure 2:
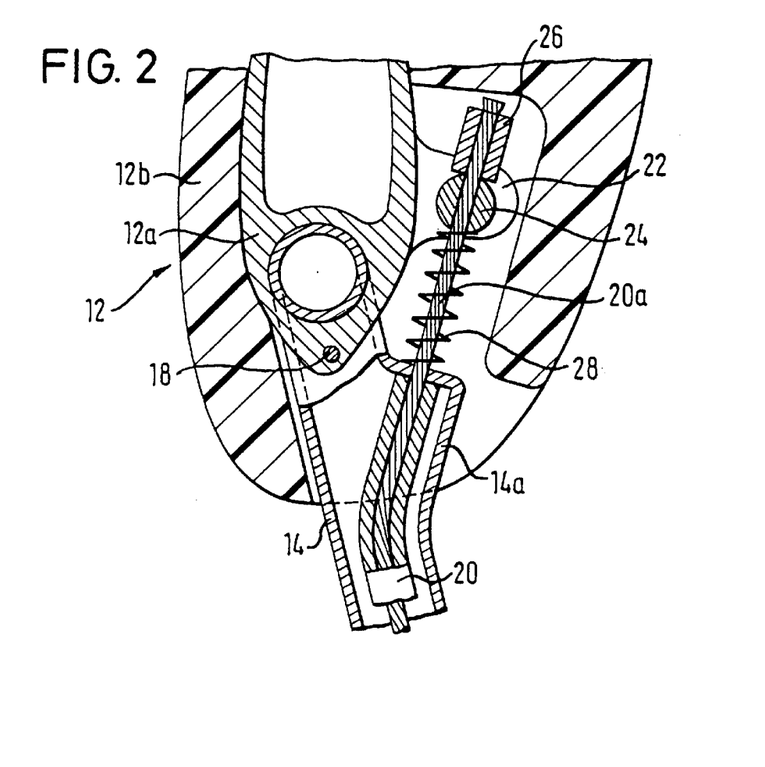
FIG. 2 is a magnified partial section view through the headrest of the vehicle seat.

The headrest 12 is locked in its normal starting position, shown in FIG. 1, by means of a shear pin 18 which protrudes through coincident holes in the rigid molding 12a and in the side of the bracket 14. The rigid molding 12a is rotatably mounted on the horizontal tubular section of the bracket 14. Provided in the vicinity of this horizontal tubular section the bracket 14 has a bulge 14a on one side which forms a guiding and support of a Bowden cable 20. The Bowden cable 20 extends through one of the two legs of the bracket 14, and its inner cable 20a passes through an opening in the bulge 14a of the bracket 14. The rigid molding 12a is provided with a lever 22 applied to one side which is engaged by the free end of the inner cable 20a of the Bowden cable. For this purpose a cross pin 24 is inserted in the lever 22, through the diametral hole of which the inner cable passes. At the free end of the inner cable 20a a nipple 26 is pressed in a force-transmitting manner into place. In conclusion, between the lever 22 and the bulge 14a of the bracket 14 a compression spring 28 is supported which surrounds the inner cable 20a.

The Bowden cable emerging from the lower end of the tubular leg of the bracket 14 is installed in the backrest 10 with a loop 20b and extends up to a piston/cylinder linear drive 30 arranged under the vehicle seat. By providing the loop 20b the Bowden cable 20 is provided with a sufficient length in reserve so as not to detriment in any way the adjustability of the backrest 10 and of the headrest 12.

Figure 4:
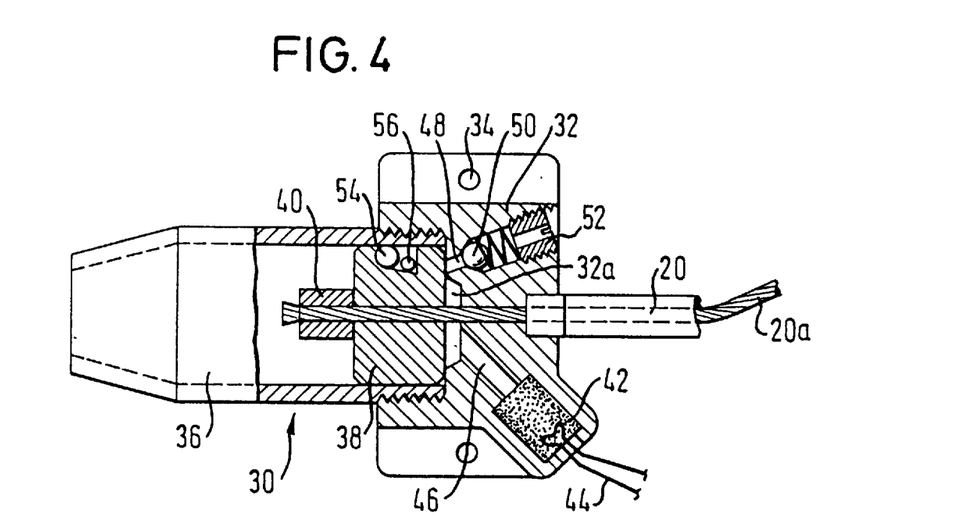
FIG. 4 is a longitudinal section through a pyrotechnical piston/cylinder linear drive.

The piston/cylinder linear drive 30 consists, as evident from FIG. 4, of a housing 32 having drilled holes 34 for securing the housing 32 to the underside of the vehicle seat, a barrel 36 screwed into the housing 32 and a piston 38 slidable therein. The casing of the Bowden cable 20 is supported by the housing 32, and its inner cable 20a extends by its free end through an axial hole of the piston 38, at the front side of which, facing away from the housing 32 the free end of the inner cable is provided with a press-fitted nipple 40. The free end of the barrel 36 is tapered in the form a truncated cone and serves as a piston catch safeguard.

In a declined hole of the housing 32 a pyrotechnical inflator 42 is inserted. This is provided with an electrical igniter which is connected via a conductor lead 44 to an activator (not shown). From the inflator 42 a passage 46 extends up to a pressure space 32a formed in the housing 32 at the bottom of the hole accommodating the barrel 36.

Also porting into the pressure space 32a is a further passage 48 which is closed off from the outside by a pressure-relief valve. This pressure-relief valve is formed by a spring-loaded ball 50 which is accommodated in the flared drilled hole of the housing 32 adjoining the passage 48 outwardly. An axial center-drilled threaded nipple 52 locates the ball 50 by the compression spring force-loading the ball.

The piston 38 is provided with a return stop consisting of a ramp surface formed at the bottom of a cut-out in the shell surface of the piston 38, a roll body mounted thereon in the form of roll 54 and an elastic body 56 which urges the roll 54 against the inner side of the barrel 36. This return stop does not obstruct movement of the piston 38 away from the housing 32, but prevents its return movement against the housing.

In the case of a rear end collision of the vehicle the activator emits via the conductor lead 44 an electrical pulse to the igniter of the inflator 42. The compressed gases then liberated by the activated inflator 42 pass through the passage 46 into the pressure chamber 32a and impact the adjacent face of the piston 38. The latter is driven in the interior of the barrel 36, taking with it the inner cable 20a of the Bowden cable 20. The drive force thus made available is then transmitted by the Bowden cable 20 to the headrest 12 and engages via the end of the inner cable 20a the lever 22 of the rigid molding 12a. The headrest 12 is then, as indicated by an arrow in FIG. 1, swivelled clockwise and approximates the head of the vehicle occupant. As soon as the headrest 12 contacts the head of the vehicle occupant, it comes up against increased resistance, as a result of which the pressure in the interior of the pressure chamber 32a or barrel 36 increases. This increase in pressure is restricted, however, by the pressure-relief valve, the ball 50 of which lifts from its sealing seat at the adjacent end of the passage 48 so that a flow path materializes from the pressure chamber 32a through the passage 48 outwardly. Due to the pressure restricting function of the pressure-relief valve, the headrest 12 is prevented substantially from swivelling past the angle at which contact with the head of the vehicle occupant occurs.

Following swivelling of the headrest 12 the latter remains in the forwardly swivelled position since the piston 38 is blocked by the return stop achieved by means of the roll 54. If, however, a return movement of the headrest is desired for the purpose of reducing energy peaks it is merely required that the wall of the barrel 36 is configured plastically deformable so that the roll 54 does not block the return movement of the piston 38, but instead merely making it more difficult. The desired energy reduction results from plastic deformation of the wall of the barrel 36 by means of the roll 54.

Figures 5, 6:
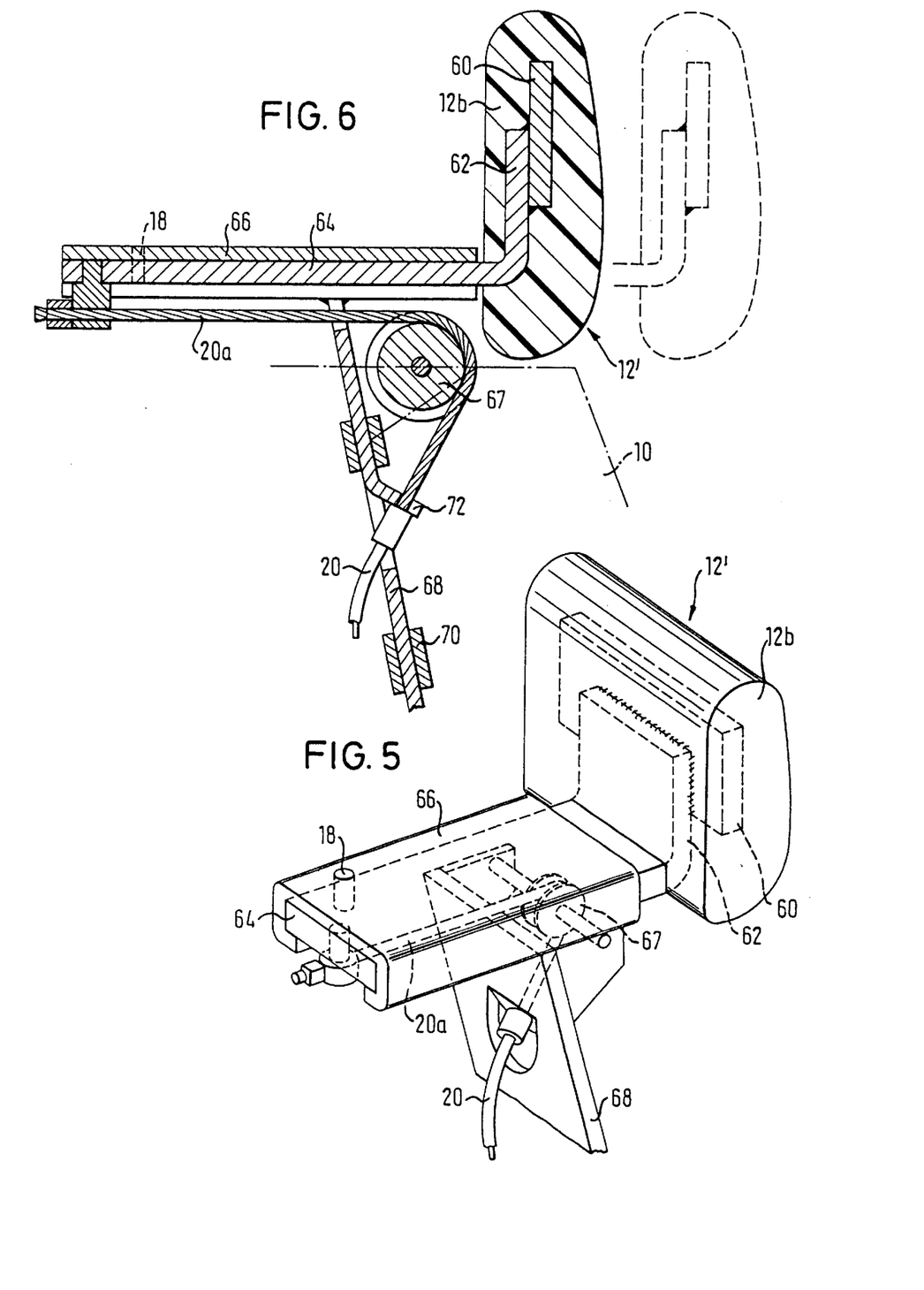
FIG. 5 is a perspective view of a headrest as part of a vehicle seat in accordance with a second embodiment in which the headrest is mounted linearly shiftably.
FIG. 6 is a longitudinal section through the headrest as shown in FIG. 5.

In FIG. 5 a linearly shiftably guided headrest 12' is shown which comprises, surrounded by a pad 12b, a plate 60 to which in turn an angled flat section 62 is welded. The arm of the flat section 62 extending from the pad 12b forms a mounting section 64 for the headrest 12'. The mounting section 64 is received in a linear guide 66 in the form of a flat guide. In the starting position a shear pin 18 connecting the linear guide 66 and the mounting section 64 prevents any shifting of the headrest 12'. The inner cable 20a of the Bowden cable 20 is secured to the end of the mounting section 64 opposing the headrest 12'. The inner cable 20a runs parallel to the linear guide 66 and, at the front end thereof, is guided into the interior of the backrest 10 by a roll 67 which is mounted at a frame part 68 mounted in the backrest 10. Instead of a rotatable roll 67 a rigid, bow-shaped cable deflector may also be provided. In turn, the plate-shaped frame part 68 is inserted height-adjustably in a guide 70 in the backrest 10. A tongue-shaped, angled lug 72 of the frame part 68 serves to support the casing of the Bowden cable 20. The headrest 12 is particularly suitable for incorporating in the rear seats since its overall height is relatively slight. The linear guide 66 may be disposed horizontally or slanting at an angle upwards in the direction of the head of the vehicle occupant.

Figure 3:
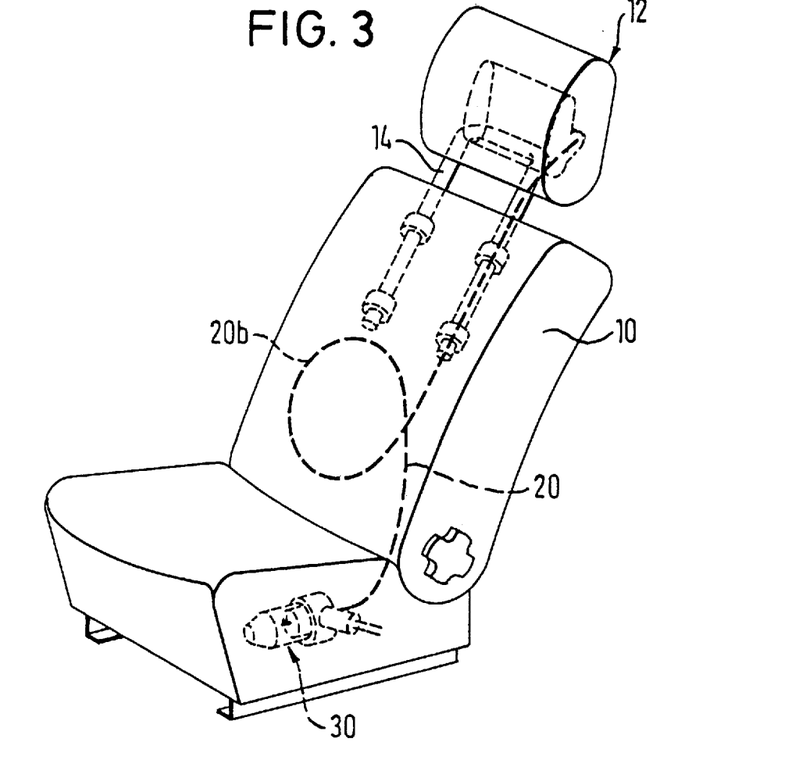
FIG. 3 shows the vehicle seat of FIG. 1 schematically in a perspective view as viewed slantingly to the front.

The Bowden cable 20 also in the embodiment as shown in FIGS. 5 and 6 is connected to a positioner 30 as is shown in FIGS. 3 and 4.

In a crash situation the inner cable 20a receives a force via the positioner 30 which results in shearing of the shear pin 18 and a shift in the headrest 12' into the position depicted by the broken lines in FIG. 6. The actions of the force limiting and return stop correspond to those of the embodiment depicted in FIGS. 1 and 2.

Figure 7:
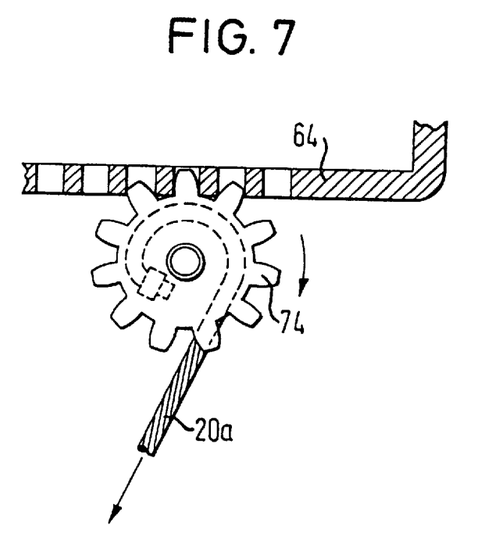
FIG. 7 is a drive means having a gearwheel for the linearly shiftable headrest.
Figure 8:
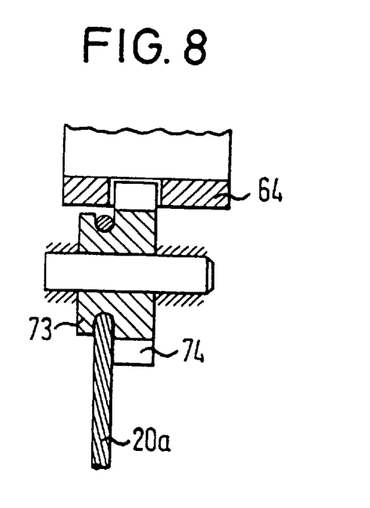
FIG. 8 is an axial section through the drive means as shown in FIG. 7.

Whilst in the case of the embodiment shown in FIGS. 5 and 6 the inner cable 20a directly engages the mounting section 64, it is secured to a side flange 73 of a pinion gear 74 in the embodiment shown in FIGS. 7 and 8, the gear being rotatably mounted on the frame part 68. A groove in the flange 73 ensures guidance of the inner cable 20a which envelopes the flange 73 roughly once. The teeth of the pinion gear 74 mate with the counter teeth in the mounting section 64. When the inner cable 20a is shifted the pinion gear 74 is caused to rotate and shifts the headrest 12' in the direction of the head of the vehicle occupant following shearing of the shear pin 18.

Figure 9:
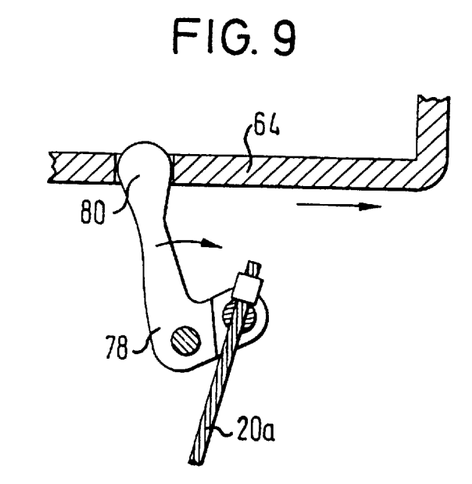
FIG. 9 shows a further possibility of driving the linearly shiftable headrest, having a swivable lever.
Figure 10:
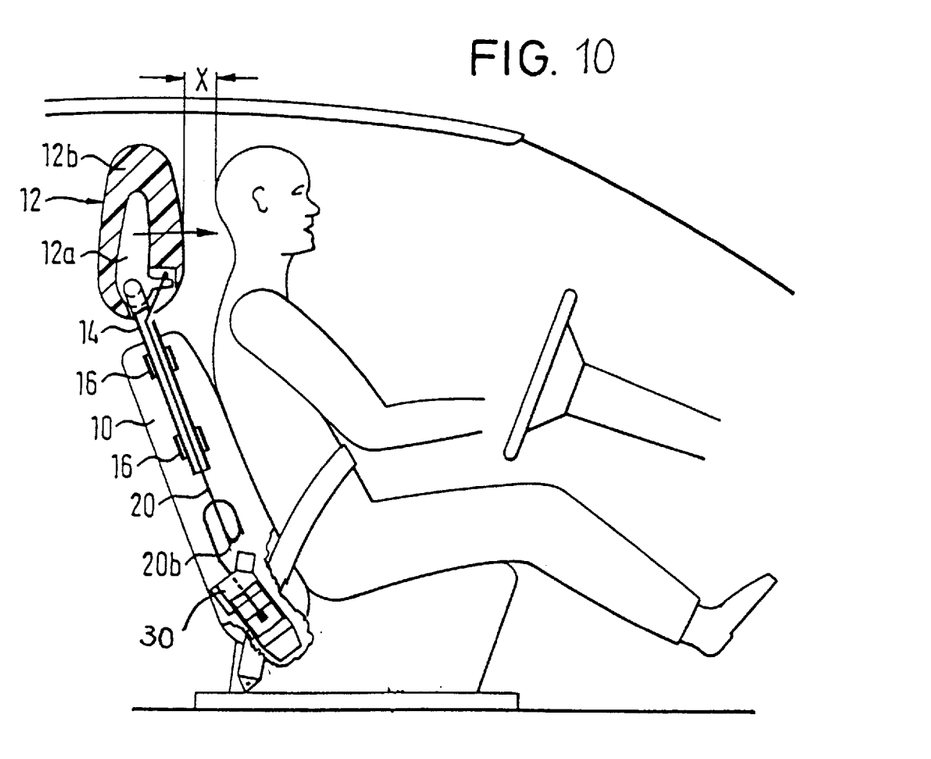
FIG. 10 is a schematic view of another embodiment of the present invention.

In the case of the embodiment shown in FIG. 9 the inner cable 20a is fixed to a first arm of a two-armed lever 78 which is swivably mounted on the frame part 68. The second arm 80 of the lever 78 engages a recess in the mounting section 64 so that on shifting of the inner cable 20a and swivelling of the lever 78 also the mounting section 64 and thus the headrest 12' are shifted. The lever arm, with which the inner cable 20a engages the first arm is preferably smaller than that with which the second arm 80 engages the mounting section 64, as a result of which a translation into faster action can be achieved.

It is claimed:

1. A vehicle seat for a vehicle occupant, said seat comprising a backrest, a headrest displaceably attached to said backrest and being movable from a normal starting position forwardly in a substantially horizontal direction into a restraint position by a headrest displacing force, a vehicle-sensitive activatable positioner generating said headrest displacing force and a flexible traction transmitting means, said traction transmitting means being coupled with said positioner and connecting said headrest and said positioner, said positioner moving said headrest in the case of a rear end collision of the vehicle from said normal starting position into said restraint position by transmitting said headrest displacing force via said traction transmitting means, and said traction transmitting means extending through said backrest.

2. The vehicle seat is set forth in claim 1 wherein said positioner is arranged in said backrest.

3. The vehicle seat as set forth in claim 1, wherein said positioner is arranged under said vehicle seat.

4. The vehicle seat as set forth in claim 1, wherein said positioner is a piston/cylinder linear drive activatable pyrotechnically.

5. The vehicle seat as set forth in claim 1, wherein said positioner is a piston/cylinder linear drive activatable by a stored compressed gas.

6. The vehicle seat as set forth in claim 1, wherein said traction transmitting means is freely movable in said backrest of said vehicle seat in such a manner and installed with such a length in reserve that it compensates changes in length due to a shifting in position of at least one of said headrest and of said backrest.

7. The vehicle seat as set forth in claim 1, wherein said traction transmitting means is a Bowden cable.

8. The vehicle seat as set forth in claim 1, wherein said positioner is equipped with a return stop.

9. The vehicle seat as set forth in claim 1, wherein one of a horizontally disposed linear guide and slightly inclined linear guide is provided and wherein said headrest comprises a mounting section which is received in said linear guide for a linear shift in the position of said headrest in the direction of the head of said vehicle occupant.

10. The vehicle seat as set forth in claim 9, wherein said linear guide is height-adjustable.

11. The vehicle seat as set forth in claim 9, wherein said traction transmitting means directly engages said mounting section and linearly shifts said headrest in a crash situation.

12. The vehicle seat as set forth in claim 9, wherein a rotatably mounted pinion gear having teeth and having a flange is provided and wherein said mounting section having counter teeth which mate with said teeth of said pinion gear, said traction transmitting means circumferentially enclosing said flange of said pinion gear at least in part and being secured to said pinion gear to enable said pinion gear to be caused to rotate by shifting said traction transmitting means.

13. The vehicle seat as set forth in claim 9, wherein a swivably mounted lever having at least two arms is provided, said traction transmitting means being secured to one arm of which, the second arm of which engaging said mounting section.

14. The vehicle seat as set forth in claim 1, wherein a retaining means is provided which is attached to both said backrest and said headrest to fixedly secure said headrest and said backrest to each other and maintain said headrest in said starting position.

15. A vehicle seat for a vehicle occupant, said seat comprising a backrest, a headrest displaceably attached to said backrest and being movable from a normal starting position forwardly in a substantially horizontal direction into a restraint position by a headrest displacing force, a vehicle-sensitive activatable positioner generating said headrest displacing force, a flexible traction transmitting means, and a tubular bracket having hollow legs, by means of which said headrest being mounted on said backrest, said traction transmitting means being coupled with said positioner and connecting said headrest and said positioner, said positioner moving said headrest in the case of a rear end collision of the vehicle from said normal starting position into said restraint position by transmitting said headrest displacing force via said traction transmitting means, said traction transmitting means extending through said backrest, and said traction transmitting means being a Bowden cable guided through one of said legs.

16. A vehicle seat for a vehicle occupant, said seat comprising a backrest, a headrest displaceably attached to said backrest and being movable from a normal starting position forwardly in a substantially horizontal direction into a restraint position by a headrest displacing force, a vehicle-sensitive activatable positioner generating said headrest displacing force and a flexible traction transmitting means, said traction transmitting means being coupled with said positioner and connecting said headrest and said positioner, said positioner moving said headrest in the case of a rear end collision of the vehicle from said normal starting position into said restraint position by transmitting said headrest displacing force via said traction transmitting means, said traction transmitting means extending through said backrest, wherein a retaining means is provided which maintains said headrest in said starting position, and said retaining means being one of a shear pin and a latching spring each of which being overcome on activation of said positioner.

17. A vehicle seat for a vehicle occupant, said seat comprising a backrest, a headrest displaceably attached to said backrest and being movable from a normal starting position forwardly in a substantially horizontal direction into a restraint position by a headrest displacing force, a vehicle-sensitive activatable positioner generating said headrest displacing force and a flexible traction transmitting means, said traction transmitting means being coupled with said positioner and connecting said headrest and said positioner, said positioner moving said headrest in the case of a rear end collision of the vehicle from said normal starting position into said restraint position by transmitting said headrest displacing force via said traction transmitting means, said traction transmitting means extending through said backrest, wherein said positioner is equipped with a piston/cylinder linear drive having a return stop, said piston/cylinder linear drive having a cylinder with a cylinder wall and a piston arranged within said cylinder, said return stop being formed by at least one roll body, said piston having a ramp surface, said roll body being carried by said ramp surface of said piston and being maintained in spring engagement with said cylinder wall, and said roll body being moved outwardly on said ramp surface upon displacement of said headrest from said restraint back to said normal starting position to be clamped between said ramp surface and said cylinder.

18. The vehicle seat as set forth in claim 17, wherein said cylinder wall is deformable by said roll body in the sense of a force limitation by material plastic deformation upon movement of said roll body outwardly on said ramp surface into said cylinder wall.

19. A vehicle seat for a vehicle occupant, said seat comprising a backrest, a headrest displaceably attached to said backrest and being movable from a normal starting position forwardly in a substantially horizontal direction into a restraint position by a headrest displacing force, a vehicle-sensitive activatable positioner generating said headrest displacing force and a flexible traction transmitting means, said traction transmitting means being coupled with said positioner and connecting said headrest and said positioner, said positioner moving said headrest in the case of a rear end collision of the vehicle from said normal starting position into said restraint position by transmitting said headrest displacing force via said traction transmitting means, said traction transmitting means extending through said backrest, said cylinder having a pressure space and a pressure-relief valve, said pressure space being pressure-relievable by said pressure-relief valve so that said positioner is deactivated when contact between said head of said vehicle occupant and said headrest is sensed by measuring an increased pressure within said pressure space.

* * * * *

UNITED STATES PATENT AND TRADEMARK OFFICE
CERTIFICATE OF CORRRECTION

PATENT NO. : 5,882,071
DATED : March 16, 1999
INVENTOR(S) : Artur Fohl It is certified that error appears in the above-identified patent and that said Letters Patent is hereby corrected as shown below:

TITLE PAGE, ADD THE FOLLOWING:

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION | |
|---|---|---|---|---|---|---|---|---|---|---|---|---|---|
| | | | | | | | | | | | | YES | NO |
| | | WO | 9 | 6 | 0 | 6 | 7 5 2 | 7 Mar. 1996 | PCT | | | | |
| | | EP | 0 | 3 | 5 | 9 | 9 6 2 | 28 Mar. 1990 | Europe | | | | |
| | | | | | | | | | | | | | |
| | | | | | | | | | | | | | |

OTHER DOCUMENTS (Including Author, Title, Date, Pertinent Pages, Etc.)

Abstract of Japanese Patent 08 187 139 A, Vol. 96, No. 11, dated July 23, 1996.

Signed and Sealed this

Twenty-sixth Day of October, 1999

*Attest:*

Q. TODD DICKINSON

*Attesting Officer*   *Acting Commissioner of Patents and Trademarks*